2,814,607
Patented Nov. 26, 1957

2,814,607

PROCESS OF PREPARING PHENOL-DICHLORO-PHENOL-FORMALDEHYDE RESINS

George M. Wagner, Lewiston, N. Y., assignor to Olin Mathieson Chemical Corporation, a corporation of Virginia No Drawing. Application December 14, 1954, Serial No. 475,289

2 Claims. (Cl. 260—53)

This invention relates to an improved process for the preparation of resinous compositions comprising aldehydes, phenol and mixed dichlorophenols. The new process is particularly adapted to the preparation of phenolic resins of the type described in copending application, Serial No. 475,278, filed December 4, 1954, of Burnett, Wagner and Soule. These resins, which are obtained initially in the form of first stage Resole-type resins when a basic catalyst is employed, contain significant proportions of the reactive 2,5- and 2,3-dichlorophenol isomers and minor proportions of less reactive chlorophenols. The Resoles condense with aldehydes to form third stage infusible resins and are suitable for use in laminates, molding compositions, adhesive compositions, castings, surface coatings and similar applications, and are particularly valuable in that they provide products having a high chlorine content and excellent fire retardant properties.

Resins of this type comprise the condensation product of an aldehyde with a phenolic component comprising from about 15 to about 90 mole percent of phenol and about 85 to about 10 mole percent of mixed dichlorophenols. Suitable mixed dichlorophenols comprise from about 50 to about 85 mole percent of 2,5-dichlorophenol and from about 10 to about 15 mole percent of 2,3-dichlorophenol; any remainder of the mixture consisting principally of 2,4- and 2,6-dichlorophenols with or without minor proportions of other isomeric dichlorophenols and trichlorophenols. The resins are formed by heating a reaction mixture consisting of the aldehyde and the phenolic component in the presence of a small amount of a basic catalyst for a period of time ranging from about 20 to 60 minutes depending among other factors on the ratio of phenol to dichlorophenol in the phenolic component. The aqueous layer is then separated from the reaction mixture and the resin dehydrated under vacuum at temperatures up to about 120° C.

Suitable aldehydes for use in the preparation of these resins include formaldehyde and furfuraldehyde as well as other aldehydes commonly employed in the preparation of phenolic resins. Formaldehyde is preferred and can be employed in any of its various forms such as 40 per cent formalin or paraformaldehyde or in the form of formaldehyde-generating substances such as hexamethylenetetramine.

Mixed dichlorophenols suitable for use in the preparation of these resins can be readily obtained by a two-step process which comprises dehydrochlorinating waste benzene hexachloride isomers and hydrolyzing the resulting trichlorobenzenes to dichlorophenols as described in detail in copending Nicolaisen and Jenny application, Serial No. 389,163, filed October 10, 1953.

A ratio of aldehyde to phenol of from 1.5 to 2.5:1 is usually employed for these basic catalyzed resins. Suitable catalysts include aqueous caustic soda, ammonia, trimethylamine and other alkaline reacting materials commonly used in the preparation of phenolic resins. About 1 percent of the catalyst based on the weight of the aldehyde and phenolic components is usually employed.

It has now been found that improved properties can be obtained in resins of the type described above by charging all of the phenol and aldehyde to be present in the finished resin to the reaction vessel and adding the mixed dichlorophenols incrementally to the reaction mixture during the course of the reaction. A short period of refluxing after the final addition of mixed dichlorophenols usually suffices to insure completion of the reaction. The aqueous phase is then separated and the resin is dehydrated by heating to a maximum temperature of about 120° C. for a period of about 30 to 50 minutes under a pressure of 10 to 50 mm. of mercury.

It has been found that the process of the present invention in which the mixed dichlorophenols are added slowly during the condensation reaction between the aldehyde, phenol and mixed dichlorophenol components of the resins yields products which have materially lower proportions of acetone extractable materials than resins of identical composition prepared by initially charging the entire amount of mixed dichlorophenols to the reaction vessel together with the aldehyde and phenol. For example, a resin prepared from equal molar proportions of phenol and a dichlorophenol mixture comprising about 75 percent of 2,5- and 2,3-dichlorophenols, using a basic catalyst and in which all of the reactants (phenol, formaldehyde and mixed dichlorophenols) were mixed together initially had acetone extractables of about 53 percent. A resin having the same composition prepared by the method of this invention, i. e., by adding the mixed dichlorophenols slowly to a reaction mixture containing phenol and formaldehyde, contained only 15 percent of acetone extractable material.

The first stage resins prepared by the process of this invention are less viscous and more readily incorporated in the material to be laminated than similar resins prepared solely from phenol and in addition cure under milder conditions in shorter periods of time to produce laminates having outstanding hardness, and excellent mechanical properties and which are self-extinguishing without punking when ignited.

The following example, which illustrates one modification of the process of the present invention, is not to be construed as limiting the scope of the invention.

Example

The mixture of dichlorophenols used in this preparation had the following composition:

| Component: | Percent by weight |
|---|---|
| 2,5-dichlorophenol | 66 |
| 2,3-dichlorophenol | 14 |
| 2,6-dichlorophenol | 12 |
| Other dichlorophenol isomers | 2 |
| Trichlorophenols | 6 |
| Total | 100 |

A mixture of 47 parts by weight (0.50 mole) of phenol, 88 parts by weight (1.10 moles) of 40 percent formalin and 7 parts by weight of 28 percent aqueous ammonia was refluxed while adding dropwise during 0.5 hour 0.50 mole of the dichlorophenol mixture described above. After decanting the upper aqueous phase, the resin was dehydrated by heating to a maximum temperature of about 65° C. for about 1.5 hours under a pressure gradually reduced to about 15 mm.

The resulting first stage resin was dissolved in an equal weight of a mixture of 90 percent by volume of ethanol and 10 percent by volume of toluene. About 2 parts of stearic acid per 100 parts of resin were also incorporated in the solution. A weight of paper equal to that of the resin was impregnated with the solution.

The sheets were air-dried, piled and placed in a cold press. They were cured for 30 minutes at 280° F. and the laminate removed. The resulting laminate was self-extinguishing and non-punking when ignited and had good mechanical properties. This product had 15% acetone extractables.

I claim:

1. A process for the preparation of resinous compositions comprising the formaldehyde condensation products of a phenolic component consisting essentially of about 15 to about 90 mole percent of phenol and about 85 to about 10 mole percent of mixed dichlorophenols, the mixed dichlorophenols comprising about 50 to about 85 mole percent of 2,5-dichlorophenol and about 10 to about 15 mole percent of 2,3-dichlorophenol which comprises reacting the phenol and the aldehyde in a reaction mixture while incrementally adding the mixed dichlorophenols to the resulting reaction mixture during the course of the reaction.

2. A process for the preparation of resinous compositions comprising the formaldehyde condensation products of a phenolic component consisting essentially of about 50 mole percent of phenol and about 50 mole percent of mixed dichlorophenols, the mixed dichlorophenols comprising about 66 mole percent of 2,5-dichlorophenol and about 14 mole percent of 2,3-dichlorophenol with about 12 mole percent of 2,6-dichlorophenol admixed with minor proportions of other dichlorophenol isomers and trichlorophenols which comprises reacting the phenol and the aldehyde in a reaction mixture while incrementally adding the mixed dichlorophenols to the resulting reaction mixture during the course of the reaction.

References Cited in the file of this patent

UNITED STATES PATENTS 1,215,072   Steinmetz _____ Feb. 6, 1917